United States Statutory Invention Registration [19]

[11] Reg. Number: H813

Ragon [43] Published: Sep. 4, 1990

[54] COMBINED SMOKER/COOKER UNIT

[76] Inventor: Robert E. Ragon, 4002 Spring Meadow La., Flower Mound, Tex. 75028

[21] Appl. No.: 174,682

[22] Filed: Mar. 29, 1988

[51] Int. Cl.[5] ..... A47J 27/122

[52] U.S. Cl. ..... 99/467; 99/468; 99/482; 99/DIG. 10

[58] Field of Search ..... 99/468, 467, 477, 480, 99/481, 482, DIG. 10; 126/100, 154, 337 A, 285 A, 285 B, 1 AA, 1 AD, 1 AE, 25 A, 15 R

[56] References Cited

U.S. PATENT DOCUMENTS

| | | | |
|---|---|---|---|
| D. 77,795 | 2/1929 | Trier . | |
| 1,404,808 | 1/1922 | Taylor . | |
| 3,440,950 | 4/1969 | Moskal | 99/468 |
| 3,961,571 | 6/1976 | Decuir | 99/480 X |
| 4,070,958 | 1/1978 | Canright | 99/468 |
| 4,117,824 | 10/1978 | McIntire et al. | 126/15 R |
| 4,240,397 | 12/1980 | Seidel | 126/285 B X |
| 4,430,985 | 2/1984 | Huneycutt | 126/15 R X |
| 4,488,025 | 12/1984 | Tanabe | 99/325 |
| 4,608,961 | 9/1986 | Lanham, Jr. et al. | 126/285 B X |
| 4,664,026 | 5/1987 | Milloy | 99/480 X |
| 4,700,618 | 10/1987 | Cox, Jr. | 99/482 X |
| 4,757,756 | 7/1988 | Van Marr | 99/482 |

*Primary Examiner*—Charles T. Jordan
*Assistant Examiner*—Michael J. Carone
*Attorney, Agent, or Firm*—Terry M. Gernstein

[57] ABSTRACT

A combined cooker/smoker unit includes a partition dividing an open-topped container into a smoker compartment and a fuel compartment so that food can be smoked and cooked in the same unit without exposing that food directly to an open flame. The unit includes heat and mass transfer controls and an overall control for controlling the amount of heat and smoke to which the food is exposed and for automatically monitoring the conditions in the unit so that food can be repeatably and reliably cooked and smoked in an unattended manner. Alarms can also by included.

15 Claims, 2 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

COMBINED SMOKER/COOKER UNIT

FIELD OF THE INVENTION

The present invention relates in general to the field of cooking, and in particular to cooking and smoking of foods. specifically, the present invention relates to a unit which can safely and repeatably smoke and cook foods in the same unit.

BACKGROUND OF THE INVENTION

The cooking of foods by means of barbecuing has been popular for many years, and in recent times many restaurants have specialized in the preparation and serving of such foods. One example of such recent developments is the so-called mesquite food taste that is obtained by exposing the food to burning mesquite.

The usual method of preparing such foods is to cook them over an open flame. The fat from the food drips into the flame and the resulting flare-up chars the food, while the smoke generated from the fire provides the food with a smoked flavor.

The inventor is aware of many devices which are suitable for such barbecuing, with the home barbecue grille being quite popular.

However, such devices have many drawbacks when considered for home use, and many additional drawbacks when considered for use in a professional restaurant situation.

For example, the exposing of food directly to an open flame, while providing a desired barbecue flavor, also exposes that food to being charred in a manner that may be dangerous to one's health. Recent studies have indicated that food that has been charred in this manner may be carcinogenous.

Still further, such direct exposure may raise the possibility of a grease fire due to the dripping of grease directly into an open flame. As is well known, grease fires are extremely dangerous. For this reason, a home barbecue unit that exposes food directly to an open fire should never be left unattended.

In addition to the above, such method of cooking is not at all conducive to producing repeatable results. That is, the food may be smoked to just the right flavor one time, but over- or under-cooked the next due to differences in cooking conditions. This is not an entirely suitable condition for the home unit, but is not at all acceptable to a professional restaurant which must be able to provide food that is uniform from one serving to the next. Still further, due to the above-discussed dangers of grease fires, the restaurant situation is exacerbated as the fires are often large and thus should definitely not be left unattended. This may be wasteful of both manpower and difficult to achieve.

Accordingly, there is need for a unit that can both cook food in a safe and repeatable manner that can be closely controlled, yet is safe to operate, and which can be operated in an unattended manner yet will still produce safe, repeatable and precise results.

Another desirable attribute of a cooking means is efficiency. Efficiency can be achieved by a having a cooking unit perform more than one function. That is, some designs have attempted to combine cooking with warming functions to make the cooking units somewhat more efficient. However, the inventor is not aware of any cooking unit that can both cook food and smoke that food in the same unit in a manner that also satisfies the above-stated conditions and overcomes the above-stated drawbacks associated with known devices that are used to produce food having a smoked flavor.

Accordingly, there is need for a unit that can both cook and smoke food in an efficient manner while still overcoming the above-mentioned drawbacks.

OBJECTS OF THE INVENTION

It is a main object of the present invention to provide a combined smoker/cooker unit which efficiently pre-smokes and cooks food in a single unit.

It is another object of the present invention to provide a combined smoker/cooker unit that precisely and efficiently pre-smokes and cooks food in the same unit.

It is another object of the present invention to provide a combined smoker/cooker unit that is precisely controllable.

It is another object of the present invention to provide a combined smoker/cooker unit that produces repeatable results.

It is another object of the present invention to provide a combined smoker/cooker unit that is capable of smoking food without exposing that food directly to the flame of a fire being used to produce such smoke.

It is another object of the present invention to provide a combined smoker/cooker unit that is capable of using wood as a source of fuel without exposing the food to being charred by flames associated with the combustion of the fuel.

It is another object of the present invention to provide a combined smoker/cooker unit that is safe to operate.

It is another object of the present invention to provide a combined smoker/cooker unit that can be safely operated in an unattended condition and will still produced precisely controlled results even though operated in an unattended manner.

SUMMARY OF THE INVENTION

These and other objects are provided by a combined smoker/cooker unit embodying the present invention which includes an open-topped container that is divided by a partition means into a smoker compartment and a cooking compartment which are separate from each other so that combustion of fuel in the fuel compartment does not expose the food being smoked and cooked in the smoker compartment to flames. The unit includes heat and mass transfer means for controlling the temperature and smoke in each compartment. A control means is also included to control the heat and mass transfer means so that repeatable and precise results are attainable from the unit.

The flow path of smoke and air through the unit is controlled so that the conditions in each of the compartments can be used in the control of the overall unit and the conditions in each compartment can be carefully and precisely controlled. Furthermore, the unit includes a flue which can include a heat and mass measurement device. This measurement device can be connected to the control means so that the conditions in the flue can be factored into the overall control of the unit.

Each compartment is accessible via the open top of the unit and hingeably connected tops are included to close the compartments individually. Each compartment also includes a support means, for the fuel in the fuel compartment and for the food in the smoker compartment, respectively, and each of these support means is movable toward and away from the top of the unit.

The means for moving the support means is controlled by the control means of the overall unit so the position of the support means can be factored into the overall control of the unit.

In this manner, the unit can be subjected to control that will efficiently produce the most desirable results.

The unit also includes safety means for preventing accidents. The safety means includes temperature sensor for preventing the accidental touching of surfaces that are overheated. The safety means also includes means for shutting off all air flow into the unit if there is a dangerous condition, such as an out-of-control fire. The alarm means can also include audible alarms so the unit can be left unattended while it is in operation.

DETAILED DESCRIPTION OF THE PREFERRED EMBODIMENTS

As required, detailed embodiments of the present invention are disclosed herein; however, it is to be understood that the disclosed embodiments are merely exemplary of the invention which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Figure 1:
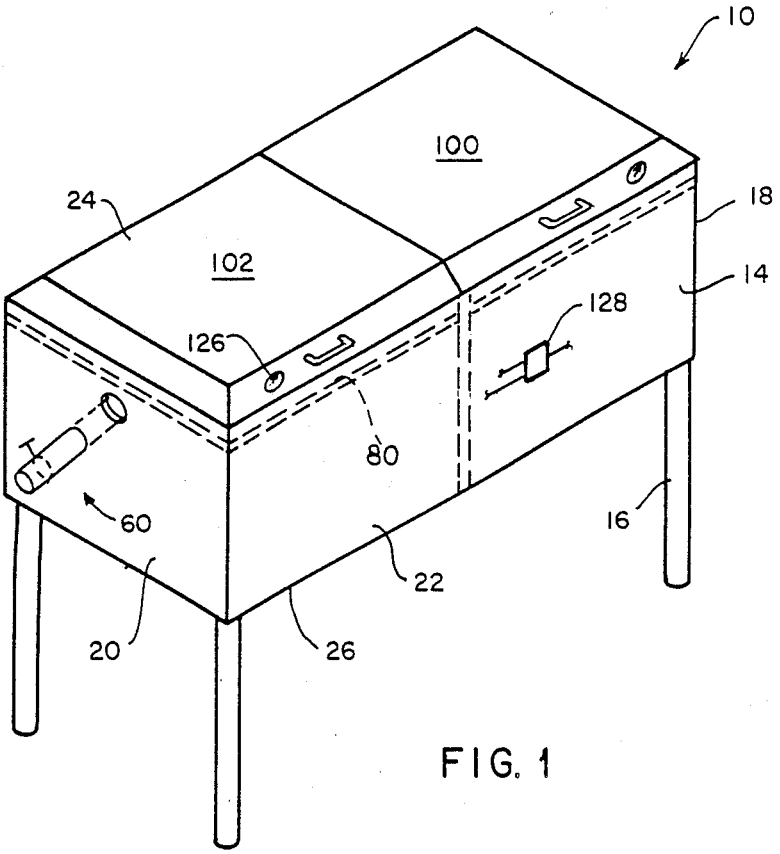
FIG. 1 is a perspective view of a portable combined cooking and smoking unit for barbecuing and smoking food and embodying the present invention.

Shown in FIG. 1 is a combined smoker/cooker unit 10 embodying the present invention. The unit 10 includes an open-topped container 12 which can be supported by a plurality of legs, such as leg 16. The container includes a first end 18 and a second end 20 which are connected by a front side 22 and a rear side 24 and a bottom 26. The sides, bottom and ends cooperate to define the open-topped container.

Figure 2:
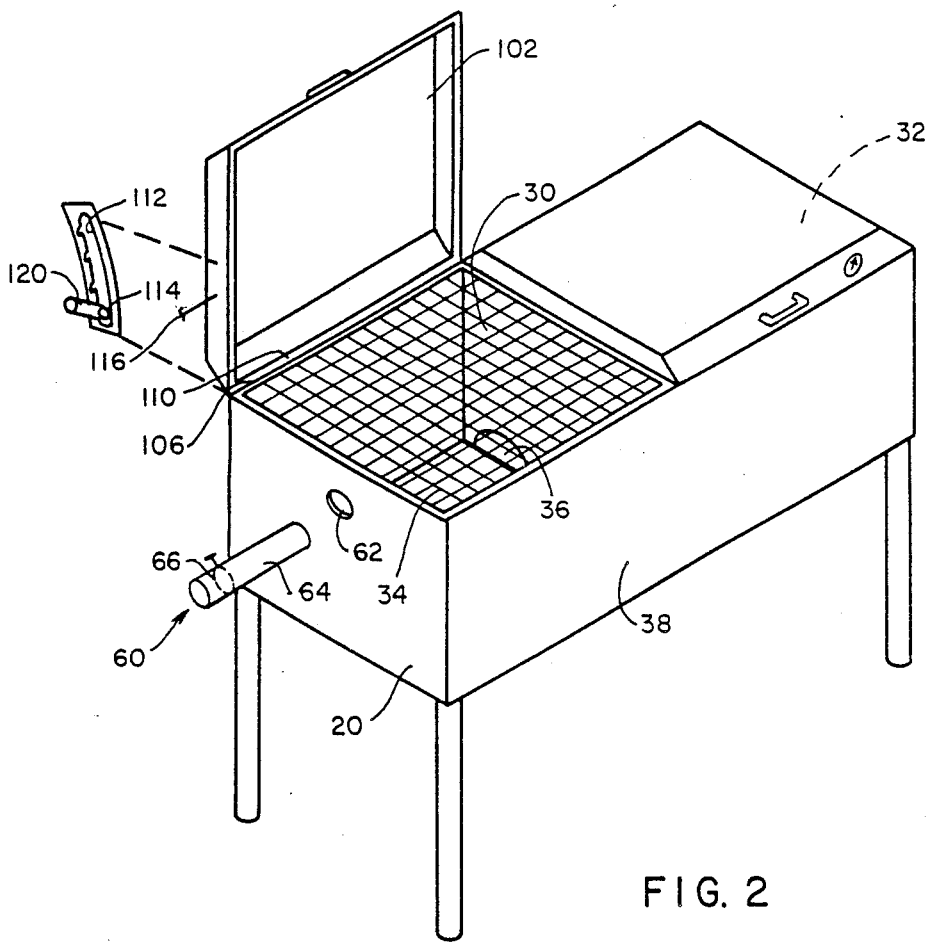
FIG. 2 is a perspective of the FIG. 1 unit in a partially open condition.
Figure 3:
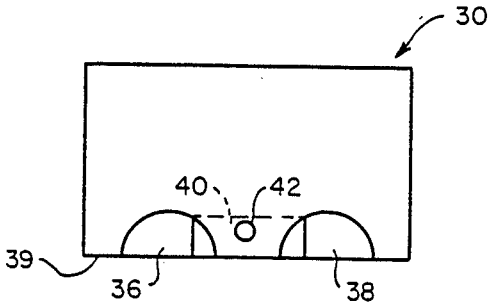
FIG. 3 is an elevation view of a partition means used in conjunction with the combined smoker/cooker unit of the present invention.

As is best shown in FIG. 2, the unit is divided by a partition means 30 which is mounted on the front and rear sides and the bottom of the container to extend from the bottom thereof to the open top so as to divide the container into two compartments. These compartments include a fuel compartment 32 located adjacent to the first end 18 and a smoker compartment 34 located adjacent to the second end 20. The partition means 30 is best shown in FIG. 3 to include two holes 36 and 38 defined adjacent to lower edge 39 thereof. Also included in the partition means is a cover 40 movably mounted on the partition means for closing and opening the holes 36 and 38. The cover includes a handle 42. The cover is shown in FIG. 3 as being monolithic, but can be collapsible so that both of the holes can be fully open at the same time or fully closed at the same time as necessary to fulfill conditions that will be discussed below. The collapsing elements can include telescoping sections which are connected by a motor-operated rack and pinion type arrangement whereby the sections can be fully extended or fully collapsed as necessary.

The holes 36 and 38 along with the cover means form part of a heat and mass transfer path through the unit 10, and heat and smoke generated in the fuel compartment will move through the holes 36 and 38 to the smoker compartment in a manner that is controlled by the amount of opening of the holes 36 and/or 38 as determined by the cover means 40.

Figure 4:
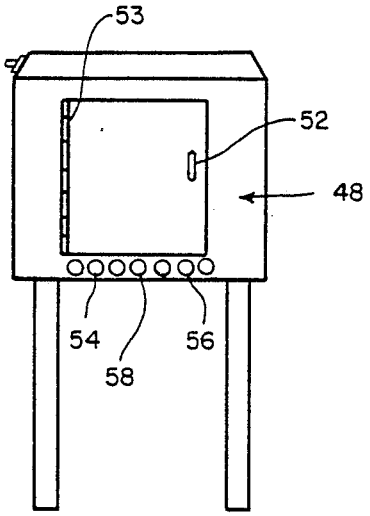
FIG. 4 is an end elevation view of the unit of the present invention.

As best shown in FIG. 4, the container includes a draft means 48 for controllably conducting ambient air into the container. The draft means 48 is located in container first end 18 and includes an access door 50 having a handle 52 thereon and being hingeably mounted on the container by a hinge 53. Fuel, such as wood, or the like, is placed into the fuel compartment via the access door 50 and ash is removed via such door. It is also noted that mesquite can be used in conjunction with the device 10.

The draft means also includes a plurality of air-conducting openings, such as spiracle-like opening 54, are defined in the container first end to be located subadjacent to the door 50. These spiracle-like openings are designed to conduct ambient air into the fuel compartment for permitting combustion of such fuel. A cover means 56 is movably mounted on the container first end to cover and uncover these openings 54 to control the amount of ambient air flowing into the fuel compartment. The cover can include a handle 58 for manual control thereof, and can be monolithic or collapsible as above discussed for the cover means 40. As will also be discussed below, the control of the cover means 56, like the control of the cover means 40, can be automatic as well.

Referring again to FIG. 2, the heat and mass transfer path also includes a flue means 60 for conducting hot gas and smoke out of the container and transferring it to a suitable location. The flue means 60 includes a hole 62 defined in second end 20 near the top thereof, and a conduit 64 fluidically connected to that hole 62. The conduit includes a damper means 66 which is controlled to open and close the conduit as necessary to influence the flow of heat and smoke through the container. The damper means includes a butterfly valve type body located inside the conduit and a handle connected to the body and extending outside of the conduit. The handle can be manually manipulated or can be controlled by a motor-operated gear system which is connected to a control means for automatic control thereof in a manner that will be evident from the ensuing discussion.

As can be seen from the above, the flow of heat and mass through the container follows a path which includes the openings 54, then flows through the fuel compartment to be heated and to receive the smoke generated by combustion of the fuel, then the combination of heat and mass flows through the holes 36 and 38 in the partition means 30 into the smoker compartment in a manner that is controlled by the degree of opening of these holes 36 and/or 38. The heat and smoke circulate through and around the smoker compartment and exit that compartment via the draft means hole 62 which is located near the top of that compartment in opposition to the bottom location of the entrance holes 36 and 38. Thus, the smoke and hot air are forced to flow on a path that circulates efficiently in the smoker compartment. The hot air and smoke are then controllably conducted out of the container via the draft means conduit.

Figure 6:
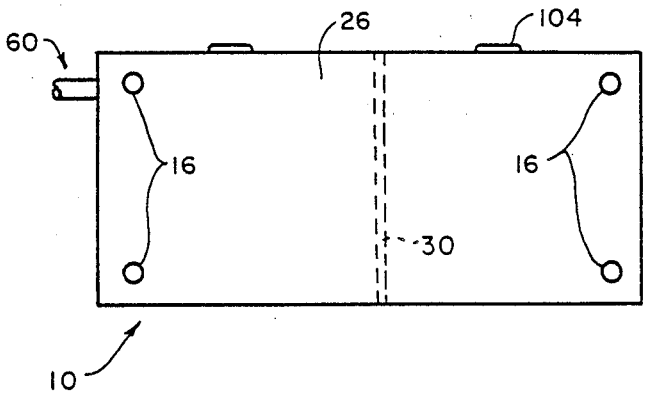
FIG. 6 is a bottom plan view of the unit of the present invention in the closed condition.
Figure 5:
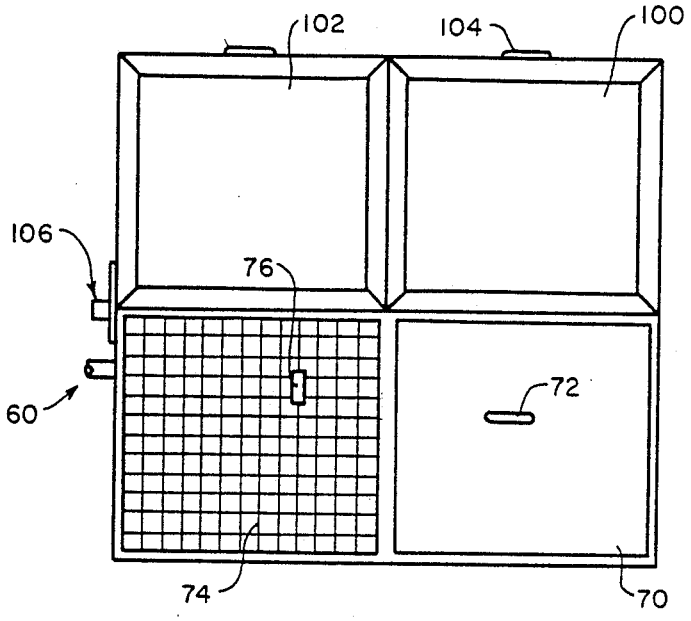
FIG. 5 is a top plan view of the unit of the present invention in the open condition.

Referring next to FIGS. 5 and 6, it can be seen that the unit 10 includes a fuel supporting grate 70 having a handle 72 thereon, and a food supporting grille 74 having a handle 76 thereon. The grate and the grille are supported on mounting means, such as flange 78 for the grate and flange 80 for the grille. The flanges are mounted on brackets, such as bracket 82 mounted on the inner surfaces of the container walls to be supported in spanning relation to the compartments. The grille and the grate are removed from the unit by grasping the handles thereof.

The brackets and flanges can include means for moving the grille and the grate up and down in the compartments. Such a moving means is indicated in FIG. 6 by the reference numeral 86, and includes a motor 88 connected to the flanges supporting the grille and the grate by a linkage 90 which includes a gear 92 meshed with a rack 94. The flange 80 can include a like means, but such is not shown in FIG. 6 for the sake of simplicity and clarity. Operation of the motor 88 causes the flange 78 to raise or lower according to the direction of operation whereby the grate can be lowered or raised. The grille can be moved in a like manner by a moving means associated therewith. The gear connection for a single flange, such as shown in FIG. 6 for flange 78, can be individually associated with the grate or individually with the grille, or these two elements can be connected to the same motor as necessary. At any rate, the grille and the grate can be raised or lowered to change the temperature to which the food supported on the grille is subjected or the amount of smoke to which such food is subjected. Movement of the grate controls the amount of smoke and heat generated within the container by the combustion of the fuel supported thereon due to the fluidic connection of the fuel compartment to the draft means.

As is also shown in FIG. 5, the unit includes a fuel compartment cover 100 hingeably connected to the rear side 24 and a fuel compartment cover 102 hingeably connected to the rear side 24. Both of these covers include handles, such as handle 104, and are movable between a fully open configuration shown in FIG. 5 to a fully closed configuration shown for the covers in FIG. 1. The unit also includes a cover control means 106 connecting the covers to the container ends. The cover control means 106 is best shown in FIG. 2, and attention is again directed to such figure. The cover control means is shown as being associated with cover 102, but a similar control means can be used in conjunction with the cover 100; however such is not shown for the sake of clarity and simplicity. As shown, the cover control means 106 includes means for holding the cover associated therewith in a partially closed configuration in order to further control the conditions existing within the container. The cove control means 106 includes a link 110 having serrated portions thereon defining a slot 112 in which a tab 114 attached to the associated cover is received. Position of the tab 114 in the serrated slot 112 is held by the serrations, and dictates the position of the cover 102 with respect to the container body. The tab 114 can have a handle 116 which is manually manipulable, or can include a motor 120 connected to the tab 114 via a linkage and gear means whereby operation of the motor moves the tab in the slot.

Figure 7:
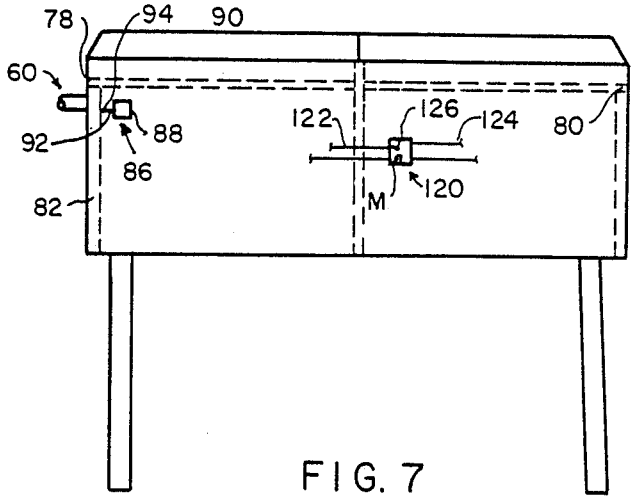
FIG. 7 is a rear elevation view of the unit of the present invention.

As indicated in FIG. 7, the unit 10 also includes a control means 120 for controlling operation of the various movable means discussed above to control the conditions in the container to be precise and repeatable. The control means 120 includes a controller element, such as a microprocessor unit M, in a housing mounted on the rear side 24 of the container and the various wiring paths are only indicated in general in FIG. 7 by wires 122 to power and wires 124 which are connected to the various elements of the control system, such as the motors, temperature sensors, and the like for the sake of simplicity; however, one skilled in the art will be able to complete the various wiring circuits from the description herein.

The control system 120 includes a temperature sensor 126 on the smoker compartment cover 102 and a thermostat on the fuel compartment cover 100. It is also noted that the covers can each include either or both of these temperature control and sensor elements if so desired. The thermostat can be used to set a desired temperature in the compartment associated therewith, and the temperature measuring element, such as a thermometer or the like, can be used to sense the temperature in the compartment associated therewith. The control system can also include a means for sensing the amount of smoke in either the fuel compartment or in the smoker compartment containing the food being prepared, or in both of these compartments. Such a smoke sensing means can be similar to those sensors used in smoke detectors commonly used in home fire and smoke alarms. Such a smoke detector would include a circuit that has been appropriately modified to sense various amounts of smoke, and to respond according to the amount of smoke detected. Suitable balancing circuits, or the like may be appropriate for such measurements. Of course, other mass measuring means can be used to measure the amount of smoke in the various locations in the unit without departing from the scope of the present invention, and such other means will occur to one skilled in the art based on the present disclosure.

All of these elements are connected to the control system controller means for sending data thereto. The control system then collects and analyzes this data in conjunction with the setting of the main control by the user, and then supervises the overall action of the various motors in response to such setting and data analysis. Such controller means is connected to the motors, such as motor 8B, motor 120 or to motors associated with the covering means associated with partition means 30 or openings 54, the draft means or the like to operate those motors to change the heat and mass flow path through the container in accordance with the setting of the thermostat and the sensed data from the temperature measuring means. The heat and mass flow path is altered by opening and/or closing the various holes, conduits and/or the covers until the temperature set in each or both of the various compartments is sensed. Suitable feedback control systems can be included in the control means to ensure proper control of the system elements. At that time, the control system merely monitors the compartments and operates the various motors to maintain such set temperature within a set range. The control can be altered by manually altering the thermostat or thermostats. Alternately, the control system can be disabled by an on/off switch 126 so that the overall container system can be operated and controlled manually if desired. Suitable alarms, such a light indicator 128 on the front side 22, can also be included to indicate a condition, such as a high temperature condition, existing within one or both of the compartments that cannot be controlled by the control system 120 or its feedback control system. Such an alarm is suitably connected to the control means M and to the various temperature sensors located in the unit 10. The alarm can also include special temperature monitors located at various positions on the container, such as on the container adjacent to the fuel compartment and subadjacent to the cover thereof, or in a similar position in the smoker compartment, or adjacent to the flue means, or the like, to monitor the unit in a manner that will render it safe for use in the totally automatic mode. The alarm system can also include a temperature monitor on the covers or on their handles Which signals a condition that would render it dangerous to touch the handles or the covers. The alarm system can also include means for automatically shutting all of the air supply holes and fully closing the covers to extinguish any fuel combustion in the event an over-temperature condition is not corrected within a predetermined time. The alarm can include audible signals as well.

It is to be understood that while certain forms of the present invention have been illustrated and described herein, it is not to be limited to the specific forms or arrangement of parts described and shown.

I claim:

1. A combined smoker/cooker comprising:

a body having first and second ends, front and rear sides, a bottom and an open top which are associated with each other to form an open-topped container;

a partition means mounted within said open-topped container, said partition means being connected to said bottom, and to said sides and extending from said front side to said rear side to divide said open-topped container into a smoker compartment located adjacent to said first end and a fuel compartment located adjacent to said second end, with said compartments extending from said ends to said partition means and from said bottom to said open top, said partition means having a hole defined therethrough for defining a heat and mass transfer path between said smoker compartment and said fuel compartment, said hole being located to be positioned adjacent to said body bottom;

a fuel supporting grate mounted in said fuel compartment;

a food supporting grille mounted in said smoker compartment;

draft means on said body in said fuel compartment and comprising draft openings in the body second end, and means for adjusting the sizes of said draft openings;

flue means associated with said smoker compartment for removing smoke and heat from said smoker compartment and comprising a passage defined in said body first end;

a smoker compartment cover hingeably connected to said body rear side; and a fuel compartment cover hingeably connected to said body rear side.

2. The combined smoker/cooker defined in claim 1 further including a thermometer mounted on said smoker compartment cover for measuring the temperature in said smoker compartment.

3. The combined smoker/cooker defined in claim 2 further including a thermostat mounted in said fuel compartment cover.

4. The combined smoker/cooker defined in claim 3 further including a control means connected to said thermometer and to said thermostat for adjusting the heat and mass transfer path in conjunction with the conditions in said fuel compartment and in said smoker compartment.

5. The combined smoker/cooker defined in claim 4 further including moving means for moving said grille and said grate toward and away from said body open top.

6. The combined smoker/cooker defined in claim 5 further including means connecting said control means to said moving means.

7. The combined smoker/cooker defined in claim 6 further including covering means for covering and opening said partition means hole to control the size of said heat and mass transfer path.

8. The combined smoker/cooker defined in claim 7 further including means connecting said covering means to said control means for controlling said heat and mass transfer path according to the conditions in said fuel and smoker compartments.

9. The combined smoker/cooker defined in claim 8 further including a temperature and mass flow measuring means in said flue means.

10. The combined smoker/cooker defined in claim 9 further including means connecting said flue temperature and mass measuring means to said control means so that overall control of the temperature in said smoker compartment and said fuel compartment can account for the temperature and the amount of smoke in said flue.

11. The combined smoker/cooker unit defined in claim 1 wherein said partition means includes a plurality of holes.

12. The combined smoker/cooker unit defined in claim 1 wherein said flue means includes a conduit connected to said body first end to be fluidically associated with said smoker compartment via said passage, said conduit having another end spaced away from said body.

13. The combined smoker/cooker unit defined in claim 4 further including means connecting said means for adjusting the sizes of said draft means openings to said control means.

14. The combined smoker/cooker unit defined in claim 4 further including cover moving means for moving said smoker compartment cover, and means connecting said cover moving means to said control means.

15. The combined smoker/cooker unit defined in claim 14, further including a fuel compartment cover moving means and means connecting said fuel compartment cover moving means to said control means.

* * * * *